United States Patent [19]
Kappe et al.

[11] 3,886,065
[45] May 27, 1975

[54] WASTE WATER TREATMENT PLANT WITH BALANCED LOAD

[75] Inventors: Stanley E. Kappe, Washington, D.C.; Dick C. Heil, Silver Spring, Md.

[73] Assignee: Kappe Associates, Inc., Rockville, Md.

[22] Filed: Feb. 15, 1974

[21] Appl. No.: 442,896

Related U.S. Application Data
[62] Division of Ser. No. 233,521, March 10, 1972, abandoned.

[52] U.S. Cl. .................. 210/15; 210/109; 210/202
[51] Int. Cl. ............................................. C02c 1/02
[58] Field of Search ............ 137/577.5, 578; 210/3, 210/13, 15, 63, 83, 97, 109, 110, 115, 117, 118, 123, 124, 136, 137, 199, 202, 205, 207–209, 221, 252, 253, 261, 319, 320, 513, 519, 532 R, 534

[56] References Cited
UNITED STATES PATENTS

| | | | |
|---|---|---|---|
| 2,601,137 | 6/1952 | Hardy | 210/109 |
| 3,397,788 | 8/1968 | Duff et al. | 210/195 |
| 3,563,383 | 2/1971 | Hellquist et al. | 210/124 |
| 3,794,167 | 2/1974 | Olgard et al. | 210/519 X |

*Primary Examiner*—Charles N. Hart
*Assistant Examiner*—Robert H. Spitzer
*Attorney, Agent, or Firm*—Young & Thompson

[57] ABSTRACT

A waste water treatment plant that receives waste water at a widely fluctuating flow rate, discharges the treated water at a much more uniform, balanced or averaged flow rate. The aeration and clarification tanks themselves are used to store the excess at peak loads at a higher water level; and a conduit that discharges from the clarification tank has metering openings therethrough to restrict the discharge of liquid from the clarification tank. Thus the liquid level in the aeration and clarification tanks will rise or fall with fluctuations in waste flow to the treatment plant; but the treated water will leave the plant at a much more uniform flow rate.

2 Claims, 3 Drawing Figures

3,886,065

WASTE WATER TREATMENT PLANT WITH BALANCED LOAD

This is a division of application Ser. No. 233,521, filed Mar. 10, 1972, now abandoned.

The present invention relates to balancing the hydraulic and organic load in waste water treatment plants.

As is well known, the quantity of waste water discharged into sewer collection systems is subject to wide fluctuations. In general, the load fluctuates throughout the day with peak load in the late morning hours and around noon, and minimum load in the several hours after midnight. On a nationwide average, at least half of this load emanates from homes and commercial establishments, and the remainder from industry. By governmental regulation, it is possible to control to some extent the hours during the day or night when industry discharges its waste water; but such regulation cannot of course be applied to homes.

In the past, it has been necessary to design waste water treatment plants with a capacity several times the average load, in order to accommodate the peak loads. This is of course very wasteful, as most of this excess capacity is idle most of the time. Accordingly, it is an object of the present invention to provide a method for balancing the load of a waste water treatment plant so that, although it receives waste water at a widely varying flow rate it, will nevertheless discharge treated water at a much more uniform rate.

Another object of the present invention is the provision of a method whereby it is not necessary to provide excess capacity for handling peak loads.

Still another object of the present invention is the provision of a method such that a waste water treatment plant which, despite greatly fluctuating intake of waste water, nevertheless operates closer to capacity for more hours per day than do existing plants.

Other objects, features and advantages of the present invention will become apparent from a consideration of the following description, taken in connection with the accompanying drawing, in which.

Figure 1:
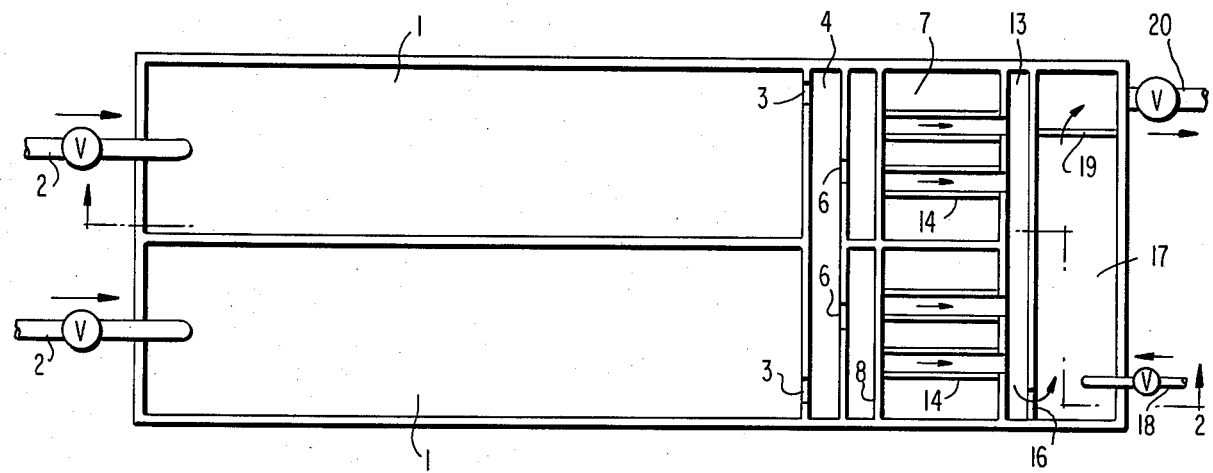
FIG. 1 is a somewhat schematic plan view of a waste water treatment plant adapted to the practice of a method according to the present invention.

Referring now to the drawing in greater detail, there is shown a waste water treatment plant adapted to the practice of a method according to the present invention, comprising a plurality of elongated aeration tanks 1 disposed in side-by-side relationship. In the drawing, two tanks 1 are shown side-by-side; but it will be appreciated that more than two tanks 1 may be so arranged. The invention also covers the circumstance in which there is only one tank 1.

Waste water is fed to tanks 1 by valve controlled conduits 2. In tank 1, the waste water undergoing aeration travels generally from left to right as seen in the drawing, during which time air or air enriched in oxygen, or commercially pure oxygen may be bubbled through the water by conventional aeration means (not shown). Alternatively, agitator means (not shown) in tank 1 may effect aeration by increasing the surface of the water exposed to ambient air, or the natural turbulence of the water may be relied upon for this purpose.

The aerated waste water leaves tanks 1 through gates 3 which are adjustable in height thereby to regulate the liquid level in tanks 1. By adjusting gates 3, it is also possible to shut off one or more of the tanks 1 for cleaning or repair or other purposes. Upon passing gates 3, the aerated waste water enters conduit 4 which is common to all the tanks 1 and which is supported by the end wall 5 of the tanks 1. The water leaves conduit 4 through gates 6 and passes to clarification tanks 7, in which the water passes underneath a baffle 8 that is conventionally provided for regulating the flow path of the water. In tanks 7, which are in alignment with and equal in number to the tanks 1, the solids settle by gravity from the liquid and come to rest on the inclined bottom wall 9 of tanks 7, whence they move or are moved in a known manner to a sump 10 from which conventional conveyor means 11 or the like convey the collected solids to a conventional discharge station (not shown).

It will be appreciated that, just as the gates 3 permit the isolation of one or more of the aeration tanks 1, the gates 6 permit the isolation of one or more of the clarification tanks 7.

Figure 3:
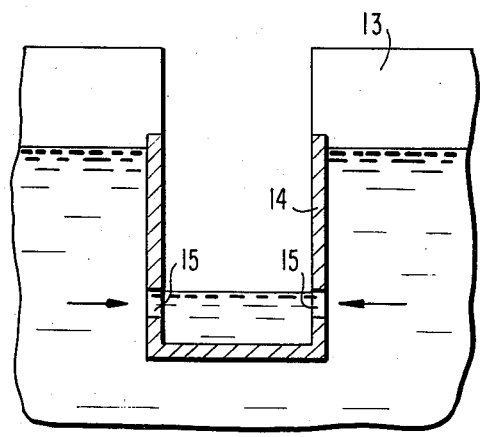
FIG. 3 is an enlarged fragmentary cross-sectional view, taken on the line 3—3 of FIG. 2, of one of the conduits that regulates liquid flow according to the present invention.

The end wall 12 of clarification tanks 7 supports a conduit 13 which is common to all of the clarification tanks 7. Between baffle 8 and conduit 13 extend in parallel a plurality of conduits 14 which are open at their top, closed at their sides and bottom, and closed at one end by the baffle 8. The conduits 14 all empty into conduit 13 and may be rather deeper than they are wide, as best seen in FIG. 3; and the upper edges of the open-top conduits 14 are spaced a substantial distance below the upper edges of the side walls of the tanks 1 and 7 and the baffle 8 and the conduits 4 and 13.

Traversing the lower portions of the side walls of conduits 14 are holes 15, whose combined area is substantially less than the cross-sectional area of conduit 14. The holes 15 thus perform a metering or restricting function: that is, they pass less liquid than would conduit 14 if conduit 14 were open at one end and immersed in the liquid. Although holes 15 are shown located in the side walls, holes 15 can be located in the bottom of conduit 14. Although conduit 14 is shown open at its top, a closed pipe with holes 15 can also be used.

Conduit 13, in turn, opens through 16 into a post-chlorination tank 17, to which chlorine or a chlorine-releasing substance is supplied through a valved conduit 18. A weir 19 regulates the discharge of chlorinated water from tank 17, whence the post-chlorinated water is discharged through valved discharge conduit 20 to the receiving waterway.

In operation, when waste water is received by aeration tank 1, it will rise in tank 1 until it flows out through gate 3 and into conduit 4 and thence through gate 6 into clarification tanks 7. Unless gates 3 and 6 are specially set, the liquid level in tanks 1 and 7 will tend to be substantially the same. When this level reaches the level of the holes 15 in conduits 14, the liquid will flow through holes 15 and thence through conduits 14 into conduit 13, through 16 and into post-chlorination tank 17, thence over weir 19 and out discharge conduit 20.

The total area of holes 15 is such as to pass liquid at a flow rate which is equal to or not much greater than the average waste water design loading of the plant or the loading at any other predetermined flow rate. Thus, if waste water were received by the plant at a constant flow rate, the liquid level would rise to the level of the openings 15 and would stay there as the predetermined flow at that level through openings 15.

Figure 2:
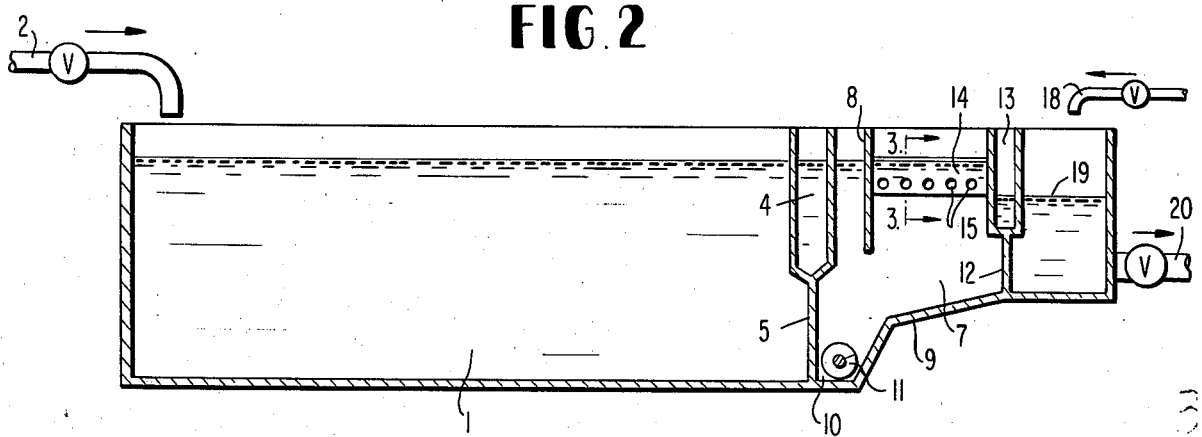
FIG. 2 is a side cross-sectional view of the plant, taken on the line 2—2 of FIG. 1.

But the waste water is not always received by the plant at an average rate. Thus, when waste water is received at a rate above the average, and above the capacity of the holes 15 to pass the water, the excess water will accumulate in the tanks 1 and 7 and the water level will rise, for example to that shown in FIGS. 2 and 3. The holes 15, however, will continue to pass water at a rate, depending on the depth of water over the hole, equal to or not much greater than the average, so that the post-chlorination tank 17 and the conduit 20 receive water at a greatly averaged or levelled flow rate.

The excess water can never overflow the tanks 1 and 7, however, as the tops of the open-topped conduits 14 are open and are disposed below the upper edges of the tanks 1 and 7. Thus, if the peak load is so great that even the higher water level in tanks 1 and 7 cannot accommodate it, then the excess water will directly overflow the upper edges of the conduits 14 and will cause an undesirable surge. Needless to say, the upper edges of conduits 14 are sufficiently high to avoid this overflow even when the anticipated peaks are reached, so that a surge will occur only under extraordinary circumstances.

The excess storage capacity is thus about equal to the area of the tanks 1 and 7 multiplied by the vertical distance between the holes 15 and the upper edges of the conduits 14. To accommodate this volume, it is not necessary to build excess equipment that would be idle at all times other than during peak flow. Instead, it is necessary only to make the tanks somewhat deeper and to provide the special conduits 14 constructed and arranged as described.

It will of course be appreciated that the flow through openings 15 will not be truly constant but will only be more constant than if the openings 15 were not provided at all. Thus, as the hydrostatic head above the holes 15 increases, for example to the head shown in FIG. 3, the flow through openings 15 into conduits 14 will be greater than if the liquid level in tanks 1 and 7 were about at the level of the holes 15.

It will of course also be understood that the liquid level in tanks 1 and 7 will continue to rise so long as the rate of flow into the tanks 1 is greater than the designed average capcity of holes 15, even though the rate of flow is declining. It is not until the rate of flow reaches average or any other predetermined flow or falls below average, that the liquid level in tanks 1 and 7 will cease to rise and will start to fall. Thus, if the flow rate into the treatment plant is plotted on a graph of flow rate on the ordinate, against time of day on the abscissa, and if the average flow rate is represented by a horizontal line on that graph, then it is possible to integrate the curve above that horizontal line of average flow rate, in order to determine the volume of storage which must be provided in a vertical direction between the level of the holes 15 and the tops of the conduits 14, and in a horizontal direction over the whole of the area of the aeration and clarification tanks.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. For example, a minimum water level can be established above holes 15, by providing a weir (not shown) at a predetermined elevation in the tail end of each conduit 14 where it discharges into conduit 13, thereby to maintain at all times a minimum hydraulic head over holes 15. This and other modifications and variations can be resorted to without departing from the purview and scope of the present invention as defined by the appended claims. Also aeration tanks 1 and clarifier tanks 7 can be separated. It is however more economical to construct the tanks in modular form as shown and to make future additions at minimum cost.

Having described the invention, we claim:

1. A method of balancing the load of a waste water treatment plant which includes an aeration tank and a clarifier tank, comprising feeding waste water to the aeration tank at a flow rate that varies between a maximum and a minimum above and below a predetermined flow rate, withdrawing from the clarifier tank treated waste water at said predetermined flow rate from a predetermined level in said clarifier tank spaced below the top of said clarifier tank, accumulating and storing in the aeration tank and clarifier tank above said level waste water that flows into aeration tank in excess of that which flows into the aeration tank at said predetermined flow rate, withdrawing said waste water at said predetermined flow rate through a plurality of openings at said level, and maintaining the liquid levels in said aeration and clarifier tanks substantially the same.

2. A method as claimed in claim 1, and withdrawing at a second level above said first level but below said top of the tank waste water at a flow rate equal to the rate at which the flow of waste water into the tank exceeds said predetermined flow rate.

* * * * *